United States Patent
Heaman et al.

(10) Patent No.: US 9,561,749 B2
(45) Date of Patent: Feb. 7, 2017

(54) PICKUP TRUCK BED LIGHTING SYSTEM

(75) Inventors: Daniel P. Heaman, South Lyon, MI (US); John U. Kowalczyk, Livonia, MI (US); Chad J. Clement, Belleville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 993 days.

(21) Appl. No.: 13/592,515

(22) Filed: Aug. 23, 2012

(65) Prior Publication Data

US 2014/0056014 A1    Feb. 27, 2014

(51) Int. Cl.
*B60Q 1/00* (2006.01)
*B60Q 3/06* (2006.01)

(52) U.S. Cl.
CPC ..................... *B60Q 3/06* (2013.01)

(58) Field of Classification Search
USPC ................. 362/485, 496, 543, 549
See application file for complete search history.

(56) References Cited

U.S. PATENT DOCUMENTS

| | | | |
|---|---|---|---|
| 2,561,756 A * | 7/1951 | Shook | B60Q 1/323 362/495 |
| 5,795,051 A | 8/1998 | Galanski | |
| 6,238,068 B1 | 5/2001 | Farmer, Jr. | |
| 6,786,623 B2 | 9/2004 | Snyder et al. | |
| 2007/0008732 A1* | 1/2007 | Robertson | B60Q 1/32 362/459 |
| 2011/0140605 A1* | 6/2011 | Mann | B60Q 1/24 315/77 |

* cited by examiner

*Primary Examiner* — Andrew Coughlin
*Assistant Examiner* — Meghan Ulanday
(74) *Attorney, Agent, or Firm* — Jason Rogers; MacMillan, Sobanski & Todd, LLC

(57) ABSTRACT

A pickup truck bed lighting system for mounting on a bed rail of a cargo bed side wall. The system including a scuff plate having a plurality of downward extending retention clips engaging holes in the bed rail to secure the scuff plate on top of the bed rail; and a lighting assembly including an electrical cable supported by the retention clips and a plurality of lamps mounted to the cable, the lamps spaced along the cable adjacent to the retention clips and aligning with the holes in the bed rail.

16 Claims, 3 Drawing Sheets

PICKUP TRUCK BED LIGHTING SYSTEM

BACKGROUND OF INVENTION

The present invention relates to a lighting system for illuminating a cargo bed of a pickup truck.

Typically, pickup truck bed lighting is provided by a lamp installed on the back wall of the cab shining light downward and rearward into the bed. This single light source may not illuminate the bed as well as is desired. Moreover, if a cover is installed on the bed, this light source may be somewhat blocked by the cover, preventing the light from reaching areas in the bed that need to be illuminated.

SUMMARY OF INVENTION

An embodiment contemplates a pickup truck bed lighting system for mounting on a bed rail of a cargo bed side wall. The system including a scuff plate having a plurality of downward extending retention clips engaging holes in the bed rail to secure the scuff plate on top of the bed rail; and a lighting assembly including an electrical cable supported by the retention clips and a plurality of lamps mounted to the cable, the lamps spaced along the cable adjacent to the retention clips and aligning with the holes in the bed rail.

An embodiment contemplates a pickup truck having a bed lighting system. The pickup truck including a cargo bed having a pair of longitudinally extending side walls and a pair of bed rails, one each on a respective one of the side walls, each of the bed rails including a plurality of holes therethrough; a pair of scuff plates, each mounted on one of the bed rails, and each of the scuff plates including at least one downwardly extending retention clip extending through one of the holes in the bed rails and engaging the bed rails to secure the scuff plates to the respective bed rails; and a lighting assembly including an electrical cable supported by the at least one retention clip on one of the scuff plates and at least one lamp mounted to the cable adjacent to the retention clip and aligned with the hole in the bed rail through which the retention clip extends.

An advantage of an embodiment is that the lighting system allows the bed to be illuminated with or without a bed cover added to the bed, and the lights are protected from damage by being recessed under the bed rails. Also, with the lighting system mounted to the scuff plates, locating and installing the lighting system can be achieved essentially simultaneously with the installation of the scuff plates. Moreover, the lamps can be installed from above the bed rails and yet extend through existing holes in the bed rails to illuminate the truck bed.

DETAILED DESCRIPTION

Figure 1:
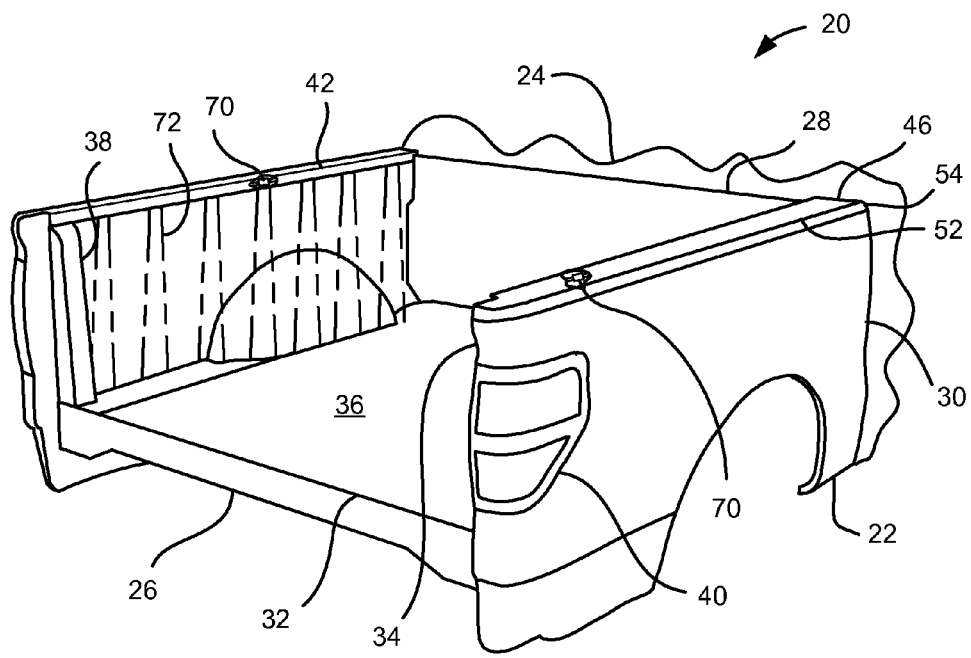
FIG. 1 is a schematic, perspective view of a portion of a pickup truck body, with cutaways schematically showing two lamps and electric cables for the lamps.
Figure 2:
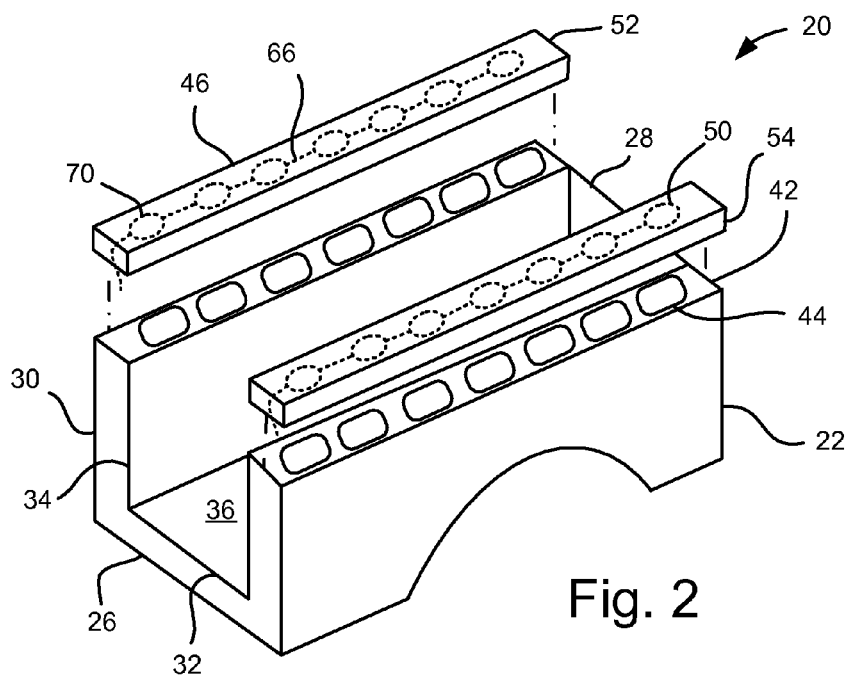
FIG. 2 is a schematic, partially exploded perspective view of a portion of the pickup truck bed, with the scuff plates shown raised above the bed rails.

FIGS. 1 and 2 illustrate a portion of a pickup truck 20, having a body 22 with a cab 24 forward of a cargo bed 26. The cargo bed 26 includes a laterally extending front wall 28 located immediately behind the cab 24, a pair of longitudinally extending side walls 30 that extend from the front wall 28 to the rear of the truck 20. A floor 32 extends between the side walls 30 from the front wall 28 to a rear opening 34 to define a cargo box 36. The rear opening 34 typically is enclosed by a rear lift gate, which may be conventional and is not shown herein. Rear corner pillars 38 (only one shown, in FIG. 1) support the side walls 30 and may include a cavity for connecting tail lamp assemblies 40 to electrical harnesses, discussed below.

Bed rails 42 extend along and form the top of the side walls 30. The bed rails 42 include a series of holes 44, which may be used to secure scuff plates 46 to the top of the bed rails 42. The scuff plates 46 may be formed of molded plastic to allow for loading and unloading of cargo from the cargo box 36 without scratching the paint on the vehicle body 22.

Figure 3:
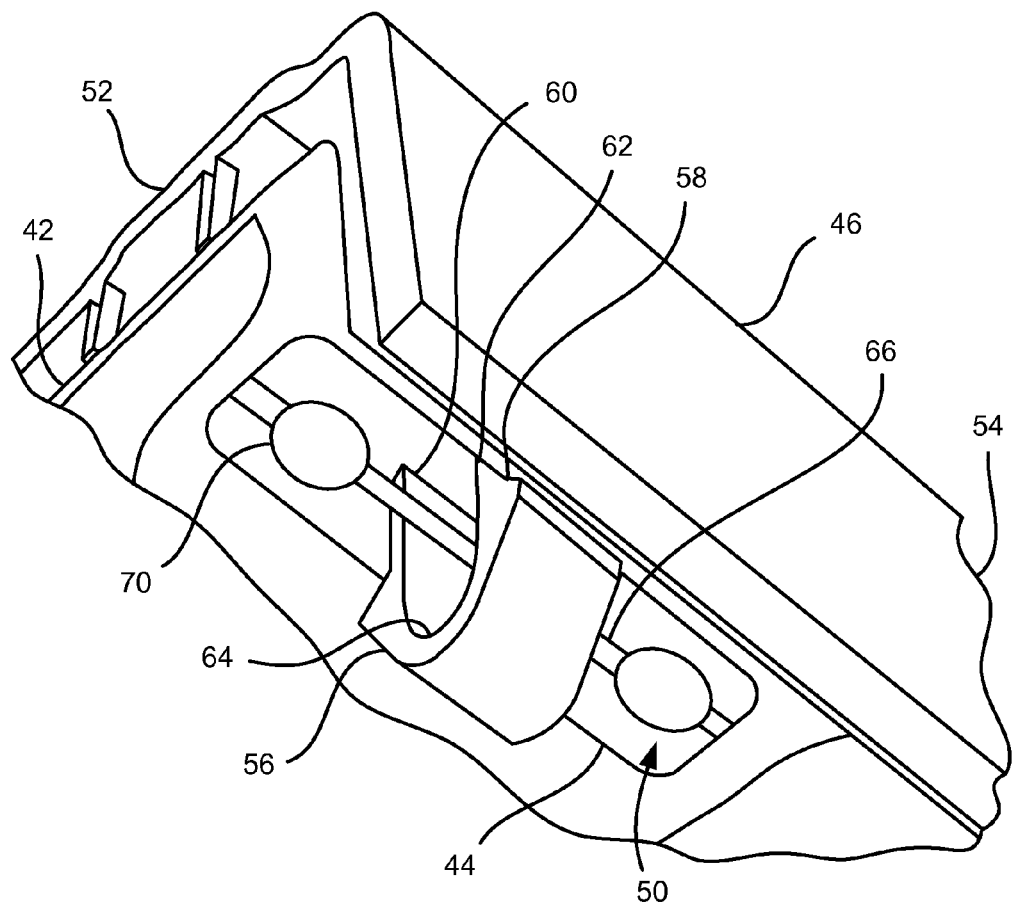
FIG. 3 is a schematic, perspective view looking up at a portion of a bed rail and scuff plate, with a portion of the lighting system shown mounted to the scuff plate.

A lighting assembly 50 for the cargo bed 26 will now be discussed relative to FIGS. 1-3. The scuff plates 46 may each include a horizontal top wall 52 that covers its respective bed rail 42 and a vertically extending side wall 54 that extends along an outer surface of the respective bed rails 42. Retaining clips 56 extend downward from the top wall 52 and are located to align with the holes 44 in the bed rails. The retaining clips 56 may be formed of plastic that allows for flexing of the retaining clips 56 during assembly of the scuff plates 46 to the bed rails 42, with the retaining clips 56 having retention barbs 58 that snap against the underside of the bed rails 42 at the periphery of the holes 44 to secure the scuff plates 46 to the bed rails 42. Each of the retaining clips 56 may have a generally U-shape that includes a first end 60 that extends from the underside of the scuff plate 46 and a free, second end 62 adjacent to the retention barb 58, with the clips 56 forming a support cavity 64 inside the U-shape.

For each scuff plate 46, an electrical cable 66 may extend through and be supported by the support cavities 64 in the retaining clips 56. The electrical cables 66 are part of the lighting assembly 50 and are connected to a series of lamps 70. The lamps 70 may be positioned on the cables 66 adjacent to the retaining clips 56, which allows the lamps 70 to align with the holes 44 in the bed rails 42. The light 72 (shown in phantom lines in FIG. 1), then, will shine down into the cargo box 36 from under the bed rails 42. The lamps 70 may be, for example, light emitting diodes (LED), conventional incandescent, or other types of light emitting devices.

The retaining clips 56 may be integral with their respective scuff plates 46—that is the retaining clips 56 may be molded with the scuff plates 46 as a single monolithic piece. When the term integral is used herein, it refers to elements that are formed as a single, monolithic piece, not elements that are formed separately and then later attached together via fasteners, adhesive, welding or some other means. By having the retaining clips 56 integral with the scuff plates 46, and the retaining clips 56 themselves supporting the electrical cables 66 and lamps 70, the lighting assembly 50 can be pre-assembled to the scuff plates 46 prior to assembling the scuff plates 46 (with the lighting assembly 50 already attached) onto the bed rails 42. The lamps 70 align with holes 44 already designed into the bed rails 42 for receiving the retaining clips 56. Thus, no additional holes need to be added to the bed rails 42 and no additional hardware is needed to mount the lighting assembly 50 since it is supported by existing retaining clips 56.

Figure 4:
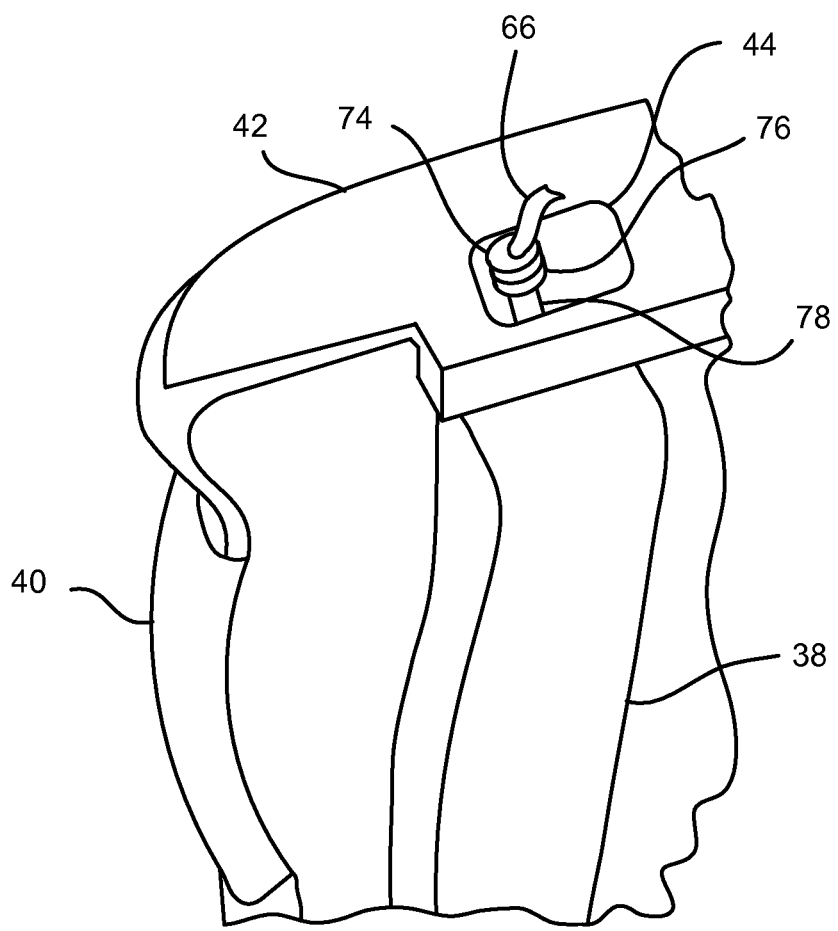
FIG. 4 is a schematic, perspective view of a portion of a bed rail and rear corner pillar, showing electrical connectors, but without the scuff plate shown.

FIG. 4 shows an example of where the electrical cable 66 may be connected to provide electrical power to the lamps. Each electrical cable 66 may have a connector 74 that mates with a connector 76 on a respective tail lamp wire harness 78, which provides electric power to the respective tail lamp assembly 40 (right or left assembly). The particular tail lamp wire harness 78 and connector 76 may be located inside the corresponding rear corner pillar 38, with a hole 44 in the bed rail 42 aligned with the rear corner pillar 38. The electrical cable 66 may then extend through this particular hole 44 into the rear corner pillar 38 to connect with the tail lamp wire harness 78. Wiring for connecting the lighting assembly 50 to a switch, which may be in the cab, and conventional source of electric power may then be included in the tail lamp wire harness 78, if so desired.

While certain embodiments of the present invention have been described in detail, those familiar with the art to which this invention relates will recognize various alternative designs and embodiments for practicing the invention as defined by the following claims.

What is claimed is:

1. A pickup truck bed lighting system for mounting on a bed rail of a cargo bed side wall comprising:
   a scuff plate having a plurality of downward extending retention clips configured to engage holes in the bed rail to secure the scuff plate on top of the bed rail; and
   a lighting assembly including an electrical cable supported by the retention clips and a plurality of lamps mounted to the cable, the lamps spaced along the cable adjacent to the retention clips and aligned with the holes in the bed rail.

2. The lighting system of claim 1 wherein at least one of the retention clips is generally U-shaped, including a first end fixed to and extending from an underside of the scuff plate, a free second end and a support cavity formed between the first and second ends, with the electrical cable supported by the support cavity.

3. The lighting system of claim 2 wherein at least one of the retention clips is integral with the scuff plate.

4. The lighting system of claim 2 wherein the at least one retention clip includes a barb adjacent to the free second end, the barb configured to engage an underside surface of the bed rail adjacent to the hole in the bed rail to retain the scuff plate on the bed rail.

5. The lighting system of claim 1 wherein the lighting assembly includes an electrical connector connected to the electrical cable, the electrical connector adjacent to a rear of the scuff plate and configured to extend through one of the holes in the bed rails into a rear corner pillar of the side wall.

6. The lighting system of claim 5 including a tail lamp wire harness having an electrical connector connected to the electrical connector of the lighting assembly.

7. A pickup truck having a bed lighting system comprising:
   a cargo bed having a pair of longitudinally extending side walls and a pair of bed rails, one each on a respective one of the side walls, each of the bed rails including a plurality of holes therethrough;
   a pair of scuff plates, each mounted on one of the bed rails, and each of the scuff plates including at least one downwardly extending retention clip extending through one of the holes in the bed rails and engaging the bed rails to secure the scuff plates to the respective bed rails;
   a lighting assembly including an electrical cable supported by the at least one retention clip on one of the scuff plates and at least one lamp mounted to the cable adjacent to the retention clip and aligned with the hole in the bed rail through which the retention clip extends.

8. The pickup truck of claim 7 wherein the lighting system includes a second electrical cable supported by the at least one retention clip on the other of the scuff plates and a least one lamp mounted to the second electrical cable adjacent to the retention clip on the other of the scuff plates and aligned with the hole in the bed rail through with the retention clip on the other of the scuff plates extends.

9. The pickup truck of claim 8 wherein the retention clips are each generally U-shaped, including a first end fixed to and extending from an underside of the respective scuff plate, a free second end and a support cavity formed between the first and second ends, with the electrical cable supported by the support cavity for the retention clip on the one scuff plate and the second electrical cable supported by the support cavity for the retention clip on the other of the scuff plates.

10. The pickup truck of claim 7 wherein the cargo bed includes a rear corner pillar extending downward from one of the bed rails and affixed to the corresponding side wall, a tail lamp assembly mounted to the side wall, the tail lamp assembly including a tail lamp wire harness having an electrical connector, and wherein the lighting assembly includes an electrical connector connected to the electrical cable and connected to the electrical connector of the tail lamp wire harness, the electrical connectors being located in the rear corner pillar.

11. A pickup truck having a bed lighting system comprising:
   a cargo bed having a bed rail on a longitudinal side wall;
   a scuff plate, mounted on the bed rail, including a clip extending downwardly through and engaging a hole in the bed rail to secure the scuff plate;
   a lighting assembly including a cable supported by the clip, and a lamp mounted to the cable aligned with the hole.

12. The pickup truck of claim 11, wherein the clip is generally U-shaped, including a first end fixed to and extending from an underside of the scuff plate, a free second end and a support cavity formed between the first and second ends, with the cable supported by the support cavity.

13. The pickup truck of claim 11, wherein the cargo bed includes a rear corner pillar extending downward from the bed rail and affixed to the side wall, a tail lamp assembly mounted to the side wall, the tail lamp assembly including a tail lamp wire harness having an electrical connector, and wherein the lighting assembly includes an electrical connector connected to the electrical cable and connected to the electrical connector of the tail lamp wire harness, the electrical connectors being located in the rear corner pillar.

14. The pickup truck of claim 11, wherein the clip is generally U-shaped, including a first end fixed to and extending from an underside of the scuff plate, a free second end and a support cavity formed between the first and second ends, with the electrical cable supported by the support cavity.

15. The pickup truck of claim 14, wherein the clip includes a barb adjacent to the free second end, the barb configured to engage an underside surface of the bed rail adjacent to the hole in the bed rail to retain the scuff plate on the bed rail.

16. The pickup truck of claim 11, wherein the clip is integral with the scuff plate.

* * * * *